United States Patent
Anderson et al.

(10) Patent No.: US 7,962,887 B2
(45) Date of Patent: Jun. 14, 2011

(54) SELF-LEARNING OF THE OPTIMAL POWER OR PERFORMANCE OPERATING POINT OF A COMPUTER CHIP BASED ON INSTANTANEOUS FEEDBACK OF PRESENT OPERATING ENVIRONMENT

(75) Inventors: Carl John Anderson, Austin, TX (US); Michael Stephen Floyd, Cedar Park, TX (US); Norman Karl James, Liberty Hill, TX (US); Phillip John Restle, Katonah, NY (US)

(73) Assignee: International Business Machines Corporation, Armonk, NY (US)

(*) Notice: Subject to any disclaimer, the term of this patent is extended or adjusted under 35 U.S.C. 154(b) by 396 days.

(21) Appl. No.: 12/139,928

(22) Filed: Jun. 16, 2008

(65) Prior Publication Data

US 2009/0312848 A1 Dec. 17, 2009

(51) Int. Cl.
*G06F 17/50* (2006.01)
*G06F 11/22* (2006.01)
*G05B 13/02* (2006.01)

(52) U.S. Cl. .......................................... 716/136; 700/28
(58) Field of Classification Search .................. 716/136; 700/28
See application file for complete search history.

(56) References Cited

U.S. PATENT DOCUMENTS

| | | | |
|---|---|---|---|
| 5,604,750 A * | 2/1997 | Levy | 714/724 |
| 6,109,201 A | 8/2000 | Petranovic et al. | |
| 6,114,880 A | 9/2000 | Buer et al. | |
| 6,502,212 B1 * | 12/2002 | Coyle et al. | 714/43 |
| 6,694,492 B1 * | 2/2004 | Shakkarwar | 716/2 |
| 6,862,540 B1 * | 3/2005 | Welch et al. | 702/44 |
| 7,171,334 B2 * | 1/2007 | Gassner | 702/182 |
| 7,231,565 B2 | 6/2007 | Lin | |
| 7,333,917 B2 * | 2/2008 | Greis et al. | 702/183 |
| 2004/0025123 A1 | 2/2004 | Angilivelil | |
| 2004/0199890 A1 * | 10/2004 | Segami | 716/7 |
| 2006/0190790 A1 * | 8/2006 | Pilling et al. | 714/734 |
| 2007/0168781 A1 * | 7/2007 | Sutardja et al. | 714/718 |
| 2011/0010133 A1 * | 1/2011 | Swanson et al. | 702/187 |

* cited by examiner

*Primary Examiner* — Stacy A Whitmore
(74) *Attorney, Agent, or Firm* — Yee & Associates, P.C.; Matthew W. Baca

(57) ABSTRACT

Sensors on the integrated circuit are used to detect the current operating state of the chip, such as frequency, voltage, temperature characteristics, or variation in the integrated circuit manufacturing process. In response, the integrated circuit may choose to modify operational parameters (such as frequency, voltage, or power-down states) in order to dynamically and autonomously maintain an optimal performance and/or power-efficiency operational point.

18 Claims, 3 Drawing Sheets

Thermometer Code — 400

| | CPM Encoding | Meaning |
|---|---|---|
| 402 | 11111 | Critical path is very early relative to the clock |
| 404 | 11110 | Critical path is early relative to the clock |
| 406 | 11100 | Critical path is neither early nor late |
| 408 | 11000 | Critical path is late |
| 410 | 10000 | Critical path is very late |
| 412 | 00000 | Critical path emergency |

SELF-LEARNING OF THE OPTIMAL POWER OR PERFORMANCE OPERATING POINT OF A COMPUTER CHIP BASED ON INSTANTANEOUS FEEDBACK OF PRESENT OPERATING ENVIRONMENT

BACKGROUND OF THE INVENTION

1. Field of the Invention

The present invention relates generally to performance or power optimization and more specifically to self-learning the optimal power or performance operating point for a chip.

2. Description of the Related Art

Guardbanding the performance of a computer chip (e.g. processor) in all cases is currently the mechanism used to guarantee correct hardware operation under rare worst-case noise event scenarios, which may never happen on some systems and/or workloads and/or physical environments. This leaves performance on the table at all times, making the chip less competitive. Current solutions involve voltage droop detectors or power estimation circuitry to guess a problem might exist and try to proactively react to it. Current solutions do not simultaneously take into account all the effects of the entire operational state of the integrated circuit, such as frequency, voltage, temperature, and manufacturing variability.

BRIEF SUMMARY OF THE INVENTION

According to one embodiment of the present invention, a sensor obtains data indicating the operational state of a region of an integrated circuit. The sensor generates a summary of the data. The sensor sends the summary to a control unit. The control unit stores the summary to form a stored summary. The control unit compares the summary to a predetermined target to identify a variance. The operating parameters of the region of the integrated circuit are adjusted to meet an objective based on the variance.

DETAILED DESCRIPTION OF THE INVENTION

Figure 1:
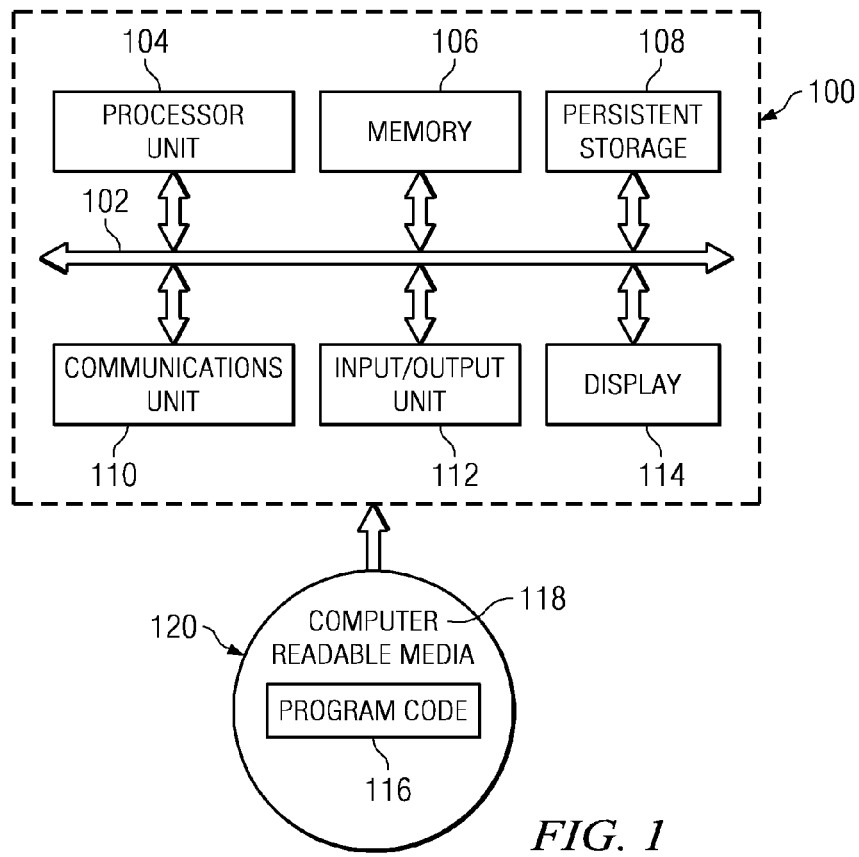
FIG. 1 is a block diagram of a data processing system in accordance with an exemplary embodiment.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Turning now to figures, FIG. 1 depicts a block diagram of a data processing system in accordance with an illustrative embodiment of the present invention. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multiprocessor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications using either or both physical and wireless communications links.

Input/output unit 112 allows for input and output of data with other devices that may connect to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer-implemented instructions, which may be located in a memory, such as memory 106. These instructions are referred to as program code, computer-usable program code, or computer-readable program code that may be read and executed by a processor in processor unit 104. The program code in the different embodiments may be embodied on different physical or tangible computer-readable media, such as memory 106 or persistent storage 108.

Program code 116 is located in a functional form on computer-readable media 118 that is selectively removable and may be loaded onto or transferred to data processing system 100 for execution by processor unit 104. Program code 116 and computer-readable media 118 form computer program product 120 in these examples. In one example, computer-readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer-readable media 118 also may take the form of a persistent storage, such as a hard drive, a thumb drive, or a flash memory that is connected to data processing system 100. The tangible form of computer-readable media 118 is also referred to as computer recordable storage media. In some instances, computer-readable media 118 may not be removable.

Alternatively, program code 116 may be transferred to data processing system 100 from computer-readable media 118 through a communications link to communications unit 110 and/or through a connection to input/output unit 112. The communications link and/or the connection may be physical or wireless in the illustrative examples. The computer-readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108, and computer-readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
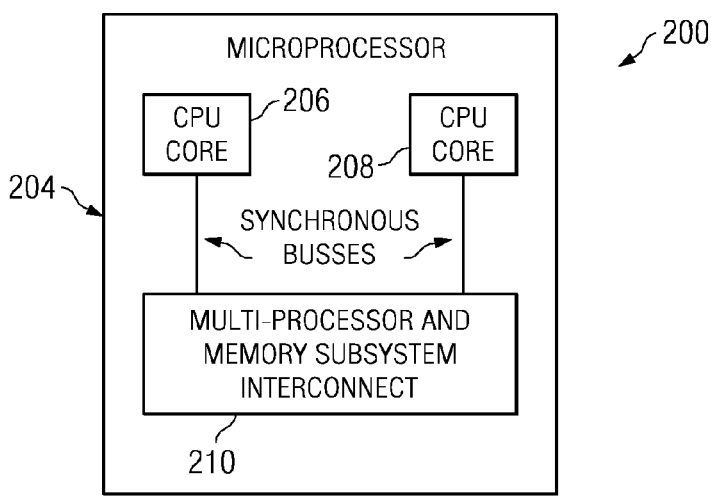
FIG. 2 is a block diagram of a processor system for processing information in accordance with an exemplary embodiment.

FIG. 2 is a block diagram of a processor system for processing information in accordance with an exemplary embodiment. System 200 comprises microprocessor 204. Microprocessor 204 may be implemented as a processor, such as processor unit 104 in FIG. 1. Microprocessor 204 comprises two central processing core chiplets, CPU cores 206 and 208, and multi-processor and memory subsystem interconnect 210.

CPU core chiplets 206 and 208 communicate with multi-processor and memory subsystem interconnect 210 through asynchronous busses. It should be noted that while microprocessor 204 is depicted as having two processor core chiplets, exemplary embodiments contemplate a microprocessor containing any number of processor core chiplets, from one to many. Optionally, these processor core chiplets may contain several levels of synchronous memory cache hierarchy for performance reasons.

Exemplary embodiments use a multi output device, such as a sensor, that measures the quality of "health" of the circuits on a region of a chip, such as a chiplet, by monitoring the performance of real circuit paths embedded in the region. A chiplet is a CPU processor core together with associated caches for that CPU core. One example of a sensor that monitors the health of the circuits of a region of chip, or health sensor, is a critical path monitor (CPM), which is described in "Circuit for Dynamic Circuit Timing Synthesis and Monitoring of Critical Paths and Environmental Conditions of an Integrated Circuit," Ser. No. 11/549,138, filed on Oct. 13, 2006. The health sensor is a mechanism that is necessary to enable the function described in this disclosure since the health sensor, such as a critical path monitor, accurately represents all operational conditions and their affect on a real representative circuit. A voltage droop sensor by itself is not sufficient, since a voltage droop is only a proxy for detecting a problem. At lower frequencies and temperatures, a voltage droop may be completely benign, whereas under different conditions, the same voltage droop may prove to be catastrophic. Exemplary embodiments customize the performance of the chip to remove unnecessary guardband, which usually consists of worst-case margin to account for unforeseen variability on top of other worst-case margin inserted during characterization.

Exemplary embodiments use a health sensor as a "representative" circuit feeding into a delay chain. A control unit, such as a digital phase lock loop (DPLL) circuit, an analog phase lock loop circuit, or a frequency lock loop circuit, uses the output of this health sensor to determine the maximum possible cycle time at that instant in time under the circuit's present operating parameters, such as temperature, voltage, operating frequency, and process-variation due to manufacturing, based on the penetration of a switching signal into the delay chain. A delay chain is a series of inverters. The health sensor obtains data that indicates the operational state of a region of an integrated circuit. The health sensor obtains this data by sending a signal to the delay chain and measuring how far the signal traverses the chain before the clock period expires. The amount of traversal indicates an amount of slack, or excess capacity, for performance that exists in a circuit.

A maximum possible cycle time is the worst-case latch-to-latch capture period. Analysis of circuits has shown that nearby circuits have very similar temperature, voltage, and manufacturing variation and can thus accurately represent, with a little guardband, the performance capability of the surrounding circuits. Sufficient numbers of health sensor circuits are placed strategically in known "hot spots" or regions of concentrated power dissipation and therefore localized temperature and voltage droop. By analyzing the penetration depth in the delay chain, the control unit algorithmically determines whether to adjust operational parameters, such as increasing operating frequency, and therefore performance, at the current operating point or increasing voltage to compensate for a voltage droop. Note that this analysis is preferably in the form of a feedback control loop to dampen noise and the likely oscillation that can occur in such a tightly coupled control system. Increasing operating frequency is usually an order of magnitude faster than changing voltage. Thus, an exemplary embodiment alters operating parameters in response to the analysis. One exemplary embodiment adjusts frequency. An alternative embodiment alters voltage in response to the analysis. Other alternate embodiments contemplate altering other physical circuit characteristics such as transistor characteristics such as bias voltage or thresholds.

Exemplary embodiments adjust the operating parameters, such as frequency and voltage, of a region of an integrated circuit based on feedback from health sensors. The region of an integrated circuit may be a processor, chiplet, or portion of a chiplet. Use of a control unit such as a digital phase lock loop circuit allows for the instantaneous changing of operating parameters that the processor chiplet is operating under. A single control unit can receive input from multiple health sensors and adjusts the operating parameters accordingly or causes the operating parameters to be adjusted accordingly, e.g. based on the worst-case feedback. Thus, various exemplary embodiments adjust the operating parameters on a regional basis, such as per chip, per chiplet, or even per portion of chiplet, depending upon the placement of and number of control units. That is, if only a single control unit is installed on the microprocessor, then only the operating frequency for the entire microprocessor may be adjusted, no matter the number of cores on the microprocessor. However, the installation of more than one control unit allows the operating frequency to be adjusted for the specific portion of the microprocessor monitored by each control unit.

Figures 4, 5:
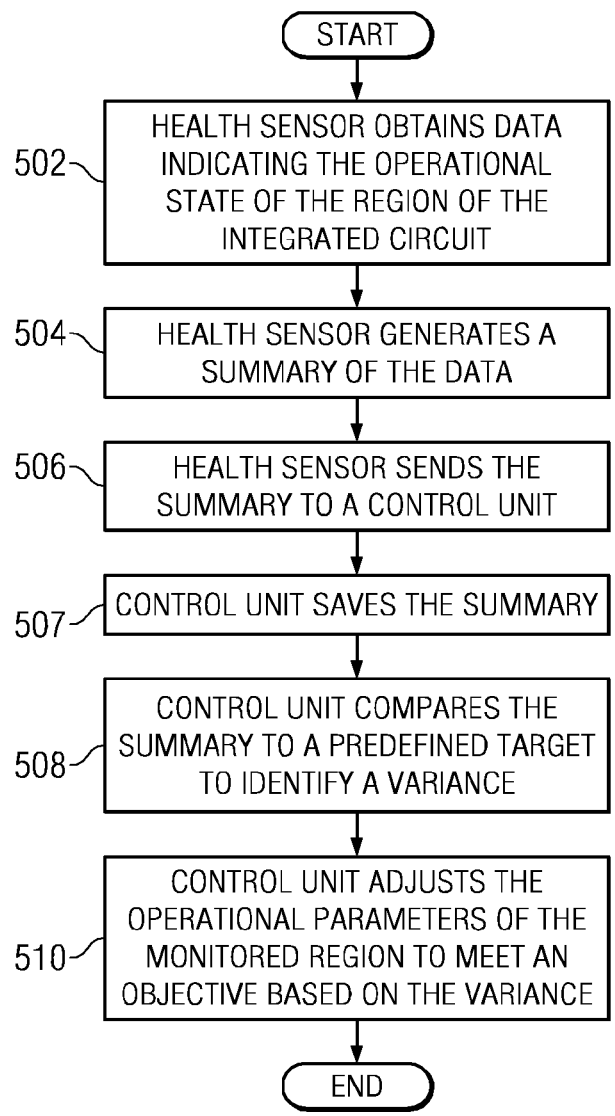
FIG. 4 is an example of a thermometer code in accordance with an exemplary embodiment.
FIG. 5 is a flowchart illustrating the operation of adjusting the operating frequency of a region of an integrated circuit in accordance with an exemplary embodiment.

In order to determine a clock delay for a circuit, which is the penetration of a signal into a delay chain, a health sensor launches a pulse. The health sensor monitors the penetration of the pulse into a fine delay chain. The health sensor outputs the result of the pulse penetrating the delay chain as a thermometer code, as illustrated in FIG. 4, which is sent to a control unit, which compares the thermometer code to a target in order to identify a variance. A variance is any difference between the summary, or thermometer code, and a target delay value. The control unit adjusts the operating parameters of the monitored chip or chiplet accordingly. Thermometer code is a series of 1's and 0's, which shows the penetration of the pulse into the delay chain.

A control unit selects a correct clock to correspond to a selected inverter delay. Thus, if a control unit is given a target delay value for a circuit, the control unit regulates the operating parameters of the chip or monitored portion of the chip to adhere to the selected target delay value. A control unit adjusts the operating parameters of the region, or portion, of the integrated circuit in order to meet an objective. Some examples of objectives to be met are to achieve optimal operating frequency, to achieve optimal power savings, to maintain a certain operating frequency or any combination thereof. A control unit adjusts the operating parameters so that the circuit operates in order to maintain a target delay value for the integrated circuit. The target delay value corresponds to the objective to be achieved. For example, in one exemplary embodiment, the control unit adjusts the operating frequency of a portion of the integrated circuit to achieve the highest speed the circuit can operate at before failing. Alternately, in one exemplary embodiment, the control unit adjusts the operating frequency to maintain a specified level of power usage or consumption. In another exemplary embodiment, the control unit adjusts the voltage to the smallest value possible to maintain a specified frequency and therefore performance level.

Figure 3:
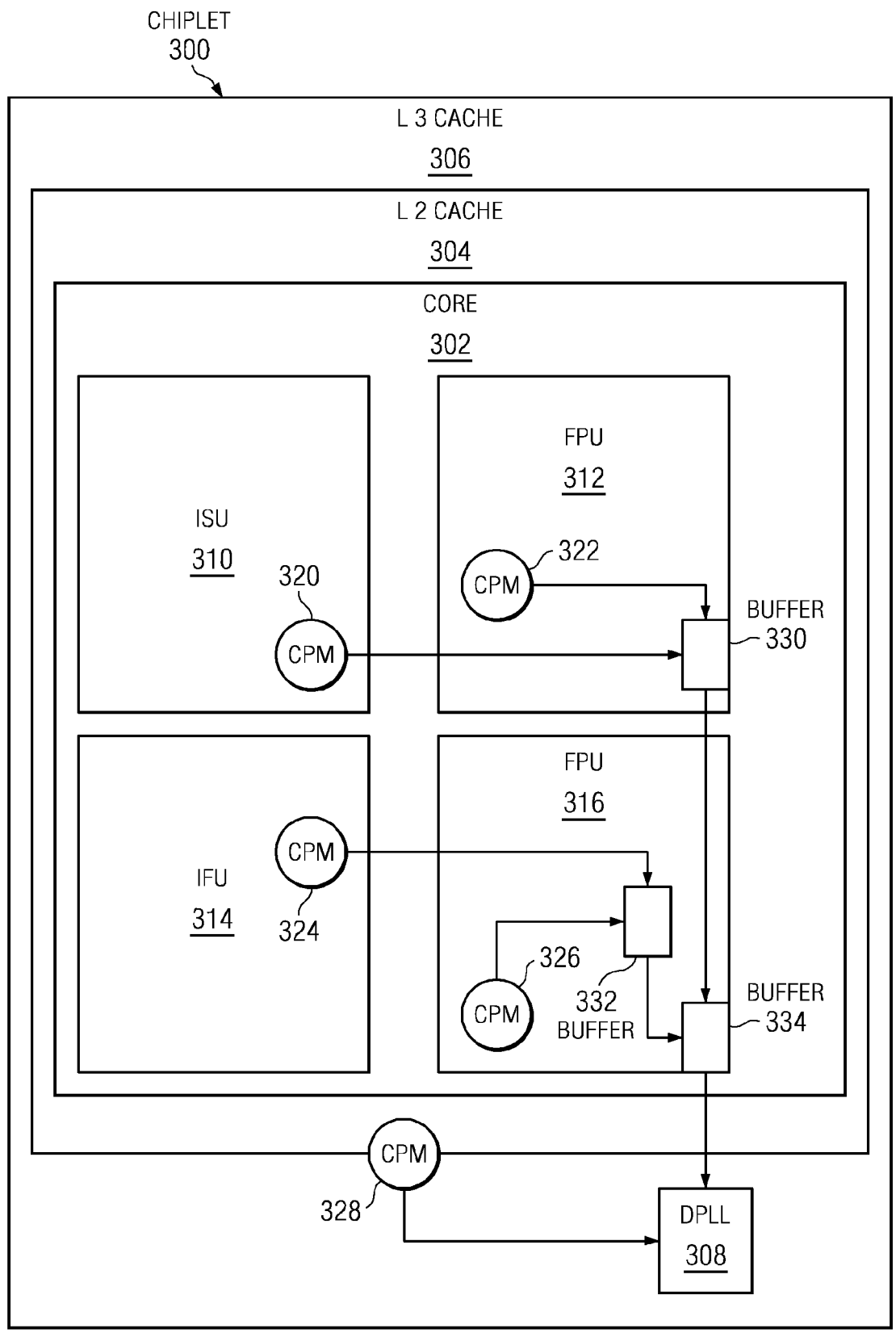
FIG. 3 is a block diagram illustrating a system for adjusting the operating frequency of a region of an integrated circuit in accordance with an exemplary embodiment.

Turning back to the figures, FIG. 3 is a block diagram illustrating a system for adjusting the operating frequency of a region of an integrated circuit in accordance with an exemplary embodiment. Chiplet 300 comprises core 302, L2 cache 304, L3 cache 306, and a digital phase lock loop DPLL 308, which is an example of a control unit. Core 302 comprises various functional units, of which instruction store unit ISU 310, instruction fetch unit IFU 314, load/store unit LSU 316, and floating point unit FPU 312 are depicted. ISU 310, FPU 312, IFU 314, and LSU 316 each have a critical path monitor, CPMs 320, 322, 324, and 326, respectively. There is also a critical path monitor situated to monitor L2 cache 304 and L3 cache 306, CPM 328. The critical path monitors are one example of a health sensor, a sensor that monitors the health of the circuits of a region of a chip. Outputs from CPMs 320, 322, 324, and 326 are combined through the use of three buffers, buffers 330, 332, and 334. Buffers 330, 332, and 334 are all AND buffers. The output from CPMs 320 and 322 are combined by buffer 330. The output from CPMs 324 and 326 are combined by buffer 332. The output from buffers 330 and 332 are combined by buffer 334. The output from buffer 334 is received by DPLL 308. Note that these buffers combine the values of the thermometer code of two health sensors into a single value by performing a bitwise AND function, such that the worst-case thermometer code is presented to the digital phase lock loop.

It should be understood that the depicted architecture is only exemplary and is not intended to in any way to limit the exemplary embodiments. In other exemplary embodiments, core 302 may be implemented with more or less than the number of depicted health sensors. In further exemplary embodiments, other functional units within core 302 other than those depicted in the present example may be implemented with health sensors. Further, rather than combining outputs from the various health sensors by using AND buffers, other exemplary embodiments have the health sensors providing input directly into DPLL 308.

During the lifetime of a chip, some well-known effects cause degeneration in the performance of the chip. Some examples of these well-known effects are electro-migration, which is the movement of atoms of metal caused by the current flow of electrons, and hot electrons, which are electrons that blast through the gate oxide of a transistor. These effects alter the performance of the chip. Monitoring the chip through the health sensors allows a control unit to react to these conditions as soon as they occur by automatically changing the operating frequency at which the circuit operates to compensate for the altered performance characteristics.

FIG. 4 is an example of a thermometer code in accordance with an exemplary embodiment. Thermometer code 400 is a table showing a health sensor output encoding and what the output means. Thermometer code 400 comprises entries 402, 404, 406, 408, 410, and 412. The saturation of the thermometer code is read from left to right. A one (1) indicates that the signal penetrated the corresponding distance into the delay chain. A zero (0) indicates that the signal did not penetrate the corresponding distance into the delay chain. Therefore, the more ones present in the thermometer code, the more slack, or operational overhead, for the circuit exists and can be taken advantage of to achieve a more optimal power, or performance operating point.

The health sensor encoding for thermometer code 400 comprises a five-bit output. However, depending upon the particular implementation, a thermometer code may be comprised of a bit code of any number, from one to hundreds or thousands. The number of bits for a specific implementation is dependent upon the sensitivity of the circuit. Furthermore, the bits in a thermometer code may represent only a portion of the latches in a delay chain and ideally can be programmably configured to tune the amount of guardband the digital phase lock loop will try to maintain. For example, a delay chain may comprise ten latches but the corresponding thermometer code output by a monitoring health sensor may comprise only five bits, with each bit corresponding to every second latch in the delay chain.

Each health sensor compares the results of the penetration of the delay chain the health sensor monitored against a target model, and summarizes this comparison by encoding the bits of the output thermometer code. In the present example, the code is a five-bit code. The health sensor sends the thermometer code, also referred to as a summary, to a control unit. The control unit combines the thermometer codes received from multiple health sensors by bit-wise ANDing the received thermometer codes together. The combined thermometer code, or summary, is stored. The control unit may store a predetermined number of summaries. In one exemplary embodiment, the control unit only stores one summary. In another embodiment, the control unit stores multiple summaries, such as the previous five summaries or the previous eight summaries, or any number of summaries. The number of summaries stored by the control unit may vary depending upon the particular implementation. ANDing the thermometer codes provided by multiple health sensors together allows the control unit to provide a worst-case critical path management, as ANDing means the thermometer code will only show penetrating of the delay chain if the signal penetrated that far in each and every health sensor. The control unit compares the current combined result to the previous combined result. In one exemplary embodiment, the control unit compares the current summary to a selected stored summary. In an exemplary embodiment, the selected stored summary is the stored summary of the immediately preceding summary. In another exemplary embodiment, the control unit compares the current summary to an average of predetermined number of previously stored summaries. Thus, the control unit identifies changes in the penetration of the path. This allows the control unit to adjust the operating parameters of the monitored region by giving extra importance to those bits that have changed from the previous result. The changed bits provide an indication to the control unit of future changes in the performance of the monitored region. For example, the fact that one less latch has been penetrated during the current result compared to the previous result may indicate that the operational environment is becoming less safe. Therefore, while the current result taken alone might indicate that there is room to alter the operating parameters, the fact that the signal is not penetrating the critical path as deeply as before may cause the control unit not to alter the operating parameters in anticipation of future degradation of performance. Again, here the notion of a feedback control loop in a control unit, such as a digital phase lock loop circuit, is important.

Entry 402 comprises a critical path encoding of all ones, which indicates that the critical path is early in respect to the target clock delay value. As such, there is room for altering the operational parameters of the monitored region to achieve increased performance. In contrast, entry 412 comprises a critical path encoding of all zeroes, which indicates that the critical path is in an emergency state, as the signal did not even penetrate the first latch in the delay chain. Ideally, a critical path should never reach this state and the operating parameters of the monitored region should have been altered prior to this state occurring. Entry 410 comprises a critical path encoding of a single one and four zeroes, which indicates that the critical path is in very late in respect to the target clock delay value. As such, in an exemplary embodiment, the control unit adjusts the operating parameters by lowering the operating frequency of the monitored region to increase the delay in the critical path. Ideally, the control unit will attempt to maintain the "just right" encoding corresponding to entry 406.

FIG. 5 is a flowchart illustrating the operation of adjusting the operating parameters of a region of an integrated circuit in accordance with an exemplary embodiment. The operation of FIG. 5 may be performed by a health sensor, such as CPM 320 in FIG. 3 and a control unit, such as DPLL 308 in FIG. 3. The operation begins when a sensor that monitors the health of the circuits of a region of a chip, a health sensor, obtains data indicating the operational state of the region of the integrated circuit (step 502). One example of a health sensor is a critical path monitor. Typically, the data comprises information regarding the penetration of a signal into a delay chain that is monitored by the health sensor. The region may be the entire integrated circuit, a chiplet, or even a portion of the chiplet. The health sensor generates a summary of the data (step 504). Generating a summary of the data, such as a clock delay, of the region of the integrated circuit by a health sensor comprises comparing a penetration of a signal into a delay chain to a target model of the penetration of the delay chain, forming the summary. The summary is expressed as series of bits, wherein a one (1) indicates that the signal penetrated that portion of the delay chain. The health sensor sends the summary to a control unit (step 506). A digital phase lock loop circuit is an example of a control unit. The control unit saves the summary (step 507). The control unit compares the summary to a predefined target to identify a variance (step 508). In one exemplary embodiment, the predefined target is a target delay value. The control unit adjusts the operational parameters of the monitored region to meet an objective based on the variance (step 510) and the operation ends. A single control unit adjusts the operating parameters for a single region of the integrated circuit. Some examples of operating parameters, include, but are not limited to, frequency, voltage, transistor characteristics, and so forth. Some examples of transistor characteristics include, but are not limited to a bias voltage, a gate threshold, and so forth.

In an alternate embodiment, multiple health sensors are implemented to monitor a single region of the integrated circuit. Each health sensor supplies a summary to the control unit, forming a set of summaries. The control unit ANDs the individual summaries together to form an aggregate summary. In another exemplary embodiment, the control unit compares the current aggregate summary to a previously stored summary or previously stored aggregate summary to identify the variance. The variance indicates bits in the current aggregate summary that have changed from bits in the previous summary. The control unit adjusts the operating parameters of the region of the integrated circuit based on the variance in order to meet an objective, such as to maintain a target clock delay.

Thus, exemplary embodiments simultaneously take into account all the effects of the entire operational state of the integrated circuit, such as frequency, voltage, temperature, and manufacturing variability. Exemplary embodiments use health sensors to obtain data that indicates the operational state of the circuits on a region of a chip, such as a chiplet, by monitoring the performance of real circuit paths embedded in the region. Exemplary embodiments customize the performance of the chip to remove unnecessary guardband. Exemplary embodiments use a health sensor circuit as a "representative" circuit feeding into a delay chain. A control unit uses the output of this health sensor to determine the maximum possible cycle time at that instant in time under the circuit's present operating parameters, such as temperature, voltage, operating frequency, and process-variation due to manufacturing, based on the penetration of a switching signal into the delay chain. Thus, an exemplary embodiment alters operating parameters in response to the analysis. Thus, various exemplary embodiments adjust the operating parameters on a regional basis, such as per chip, per chiplet, or even per portion of a chiplet, depending upon the placement of and number of control units.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of adjusting operating parameters of a region of an integrated circuit, the computer-implemented method comprising:
   obtaining data indicating the operational state of the region of the integrated circuit by sensors;
   receiving, by a control unit, a set of summaries of the data, wherein each summary of the set of summaries is generated by a different sensor;
   combining each summary in the set of summaries to form an aggregate summary;
   comparing the aggregate summary to a predefined target by the control unit to identify a variance; and
   adjusting the operating parameters of the region of the integrated circuit to meet an objective based on the variance.

2. The computer-implemented method of claim 1, wherein the region of the integrated circuit comprises the integrated circuit.

3. The computer-implemented method of claim 1, wherein the region of the integrated circuit comprises a core of the integrated circuit and memory cache associated with the core.

4. The computer-implemented method of claim 1, further comprising:
   comparing the aggregate summary to a selected stored summary to identify the variance, wherein the variance indicates bits in the aggregate summary that have changed in comparison to bits in the stored summary.

5. The computer-implemented method of claim 1, wherein generating each summary of the data by each sensor comprises:
   comparing a penetration of a signal into a delay chain to a target model, forming each summary.

6. The computer implemented method of claim 1, wherein the operational parameters comprise a frequency, a voltage, and a transistor characteristic.

7. The computer implemented method of claim 6, wherein the transistor characteristic comprises one of a bias voltage and a gate threshold.

8. The computer implemented method of claim 1, wherein the objective is one of achieving a fastest speed that the integrated circuit can operate at without failing, maintaining a specified level of power usage, and maintaining a specified frequency.

9. The computer implemented method of claim 1, wherein the target is a delay value.

10. A data processing system for adjusting operating parameters of a region of an integrated circuit, the data processing system comprising:
    a bus;
    a storage device connected to the bus, wherein the storage device contains computer usable code; and
    a processing unit connected to the bus, wherein the processing unit comprises:
    a plurality of health sensors;
    a control unit;
    wherein each of the plurality of health sensors obtains data indicating the operational state of the region of the integrated circuit; and
    wherein the control unit receives a set of summaries of the data, wherein each summary of the set of summaries is generated by a different health sensor of the plurality of health sensors, combines each summary in the set of summaries to form an aggregate summary, compares the aggregate summary to a predefined target to identify a variance, and adjusts the operating parameters of the region of the integrated circuit to meet an objective based on the variance.

11. The data processing system of claim 10, wherein the region of the integrated circuit comprises the integrated circuit.

12. The data processing system of claim 11, wherein the region of the integrated circuit comprises a core of the integrated circuit and memory cache associated with the core.

13. The data processing system of claim 10, further comprising:
    wherein the control unit compares the aggregate summary to a selected stored summary to identify the variance, wherein the variance indicates bits in the aggregate summary that have changed in comparison to bits in the stored summary.

14. The data processing system of claim 10, wherein generating each summary of the data comprises:
    comparing a penetration of a signal into a delay chain to a target model, forming each summary.

15. The data processing system of claim 10, wherein the operational parameters comprise a frequency, a voltage, and a transistor characteristic.

16. The data processing system of claim 10, wherein the objective is one of achieving a fastest speed that the integrated circuit can operate at without failing, maintaining a specified level of power usage, and maintaining a specified frequency.

17. The data processing system of claim 10, wherein the target is a delay value.

18. An apparatus for adjusting operating parameters of a region of an integrated circuit, the apparatus comprising:
   a plurality of health sensors;
   a control unit;
   wherein each of the plurality of health sensors obtains data indicating the operational state of the region of the integrated circuit; and
   wherein the control unit receives a set of summaries of the data, wherein each summary of the set of summaries is generated by a different health sensor of the plurality of health sensors, combines each summary in the set of summaries to form an aggregate summary, compares the aggregate summary to a predefined target to identify a variance, and adjusts the operating parameters of the region of the integrated circuit to meet an objective based on the variance.

\* \* \* \* \*